United States Patent Office 3,091,544
Patented May 28, 1963

3,091,544
CRYSTALLINE SOLID SOLUTIONS WITH SILICON DIOXIDE STRUCTURES AS HOST COMPONENTS
Franz Hund, Krefeld-Urdingen, and Walter Deissmann, Krefeld, Germany, assignors to Farbenfabriken Bayer Aktiengesellschaft, Leverkusen, Germany, a corporation of Germany
No Drawing. Filed Aug. 1, 1960, Ser. No. 46,378
Claims priority, application Germany Aug. 5, 1959
12 Claims. (Cl. 106—288)

The present invention is concerned with new crystalline solid solutions with silicon dioxide structures as host components and with the process for the production of said new crystalline solid solutions.

It is known that certain trivalent and pentavalent oxides of elements, in which the cations are of suitable size, crystallize in one, some or all of the six silicon dioxide lattices, namely in high-temperature or low-temperature quartz, high-temperature or low-temperature tridymite, and high-temperature or low-temperature cristobalite. Aluminum phosphate ($AlPO_4$) shows the greatest similarity to silicon dioxide, not only with regard to their properties but also with regard to their crystalline structures: all the structures which appear in the case of silicon dioxide are observed in aluminum phosphate. Boron phosphate having the formula $BPO_4$ crystallizes in the tetragonal low-temperature cristobalite form. The tetrahydral grouping of the oxygen ions each of which carry two negative charges is common to all silicon dioxide structures, each oxygen ion belonging commonly to two tetrahydra and thus having a coordination number of 2. The six crystalline forms of silicon dioxide differ from each other with respect to the direction in which their individual tetrahydra are joined. In the interstices of two oxygen tetrahydra there are present either two tetravalent silicon ions with a total positive charge of $+8$ or, in ordered and/or disordered arrangement, 1 $Al^{+++}$ or 1 $B^{+++}$ and 1 $P^{+++++}$ ion, again with a positive total charge of $+8$. The total negative charge of the 2 oxygen tetrahydra amounts to $-8$. In this manner the normal or statistical electronic neutrality is given in the host lattices.

We have now found that genuinely or truly crystalline (as distinguished from pseudocrystalline) solid solutions with quartz and/or tridymite and/or cristobalite structure can be obtained by incorporating into silicon dioxide, aluminum phosphate or boron phosphate as host component, at least one of the pentavalent oxides of phosphorus, arsenic or vanadium and also such oxides and/or fluorides of metals having valence of 4 or less which have cationic radii between 0.23 A. and 0.98 A. with a statistical average ionic radius of all incorporated cations 0.26 A. and 0.59 A., the ratio of the sum of the added cations to the sum of the added anions being about 1:2 while preserving a statistical electronic neutrality in the lattice. The amount of the guest component is preferably not greater than the amount of the host component.

Such truly crystalline solid solutions are, for example, coloured or colourless pigments, fillers, catalysts, and, possibly, electrical semiconductors which are particularly distinguished with regard to colour strength, colour uniformity, filling properties, catalytic effectiveness and electrical properties in comparison with physical mixtures.

As guest components, the oxides and/or fluorides of the following elements are suitable (the valences and ionic radii of the elements combined in such oxides and fluorides are enclosed in the parentheses thereafter, the ionic radii representing values angstroms): lithium (I) (0.78), sodium (I) (0.98), copper (I) (0.96), beryllium (II) (0.34), magnesium (II) (0.78), zinc (II) (0.83), manganese (II) (0.91), iron (II) (0.82), cobalt (II) (0.82), nickel (II) (0.78), vanadium (II) (0.72), copper (II) (0.72), platinum (II) (0.80), palladium (II) (0.80), boron (III) (0.23), aluminum (III) (0.57), gallium (III) (0.62), titanium (III) (0.69), arsenic (III) (0.69), antimony (III) (0.90), vanadium (III) (0.65), niobium (III) (>0.69), tantalum (III) (>0.68), manganese (III) (0.70), iron (III) (0.67), rhodium (III) (0.68), silicon (V) (0.39), germanium (IV) (0.44), manganese (IV) (0.52), phosphorus (V) (0.35), arsenic (V) (0.46) and vanadium (V) (0.40) [oxygen (II) (1.32) and fluorine (I) (1.33)].

For fulfilling the requirement with respect to the guest components that the ratio of the sum of the added cations to the sum of the added anions is 1:2, while preserving the statistical electronic neutrality of the lattice, there may be used as guest components for the production of the crystalline solid solutions of the present invention, for example, for each molecule of the oxide of beryllium, magnesium, zinc, manganese (II), iron (II), cobalt (II), nickel (II), vanadium (II), copper (II), platinum (II) or palladium (II), 1 molecule of the oxide of phosphorus (V) and/or arsenic (V) and/or vanadium (V); or for each molecule of the oxide of boron, aluminum, gallium, titanium (III), arsenic (III), antimony (III), vanadium (III), niobium (III), tantalum (III), manganese (III), iron (III) or rhodium (III), 1 molecule of the oxide of phosphorus (V) and/or arsenic (V) and/or vanadium (V), or for each molecule of the oxide of lithium, sodium or copper (I), 3 molecules of the oxide of phosphorus (V) and/or arsenic (V) and/or vanadium (V) or, possibly, one or more molecules of the oxide of germanium (IV) and/or manganese (IV). The oxides of mono-, di-, tri- and tetravalent metals of the type specified can be combined with the aforesaid oxides of pentavalent elements in any desired manner. However, in all cases the requirements must be fulfilled that the ratio of the sum of the added cations to the sum of the added anions is about 1:2, while maintaining the statistical electronic neutrality of the lattice.

Furthermore, crystalline solid solutions of, for example, aluminum or boron phosphate can be formed with the difluoride of beryllium. In this case, beryllium fluoride itself crystallizes in the cristobalite form. Beryllium fluoride can be combined, for example, alone with aluminum phosphate and/or boron phosphate or with the above-mentioned crystalline solid solutions of silicon dioxide, aluminum or boron phosphate as host lattice.

Other crystalline solid solutions can contain, for example, an equimolecular mixture of cuprous fluoride and/or lithium fluoride with oxides of pentavalent phosphorus and/or arsenic and/or vanadium. In the case of the mixture of, for example, 1 molecule of phosphorus pentoxide with 1 molecule of lithium fluoride, 1 $Li^+$ and 2 $P^{+++++}$ ions $=3$ cations and 1 $F^-$ and 5 $O^{--}=6$ anions are simultaneously incorporated into the lattice. The sum of the newly introduced cationic charges amounts to $+11$ and of the introduced anionic charges to $-11$; thus, the statistical electronic neutrality is preserved.

Finally, there may be mentioned crystalline solid solutions with a combination of one or all of the above-mentioned systems. The above-mentioned large numbers of individual possibilities can be increased in that one or all of the above-mentioned series of variations can be combined with one another and, in spite of this large number of possible variations, a crystalline solid solution with a quartz, tridymite, or cristobalite structure always results.

Thus, if the amounts of the oxides of the specified pentavalent elements and the amounts of the oxides and/or fluorides of metals having a valence of 4 or less, which can be contained in the crystalline solid solutions as guest components, are adjusted relative to one another, then the ratio of the host component to the guest component can fall within wide limits. In general, however, a content of guest component of between about 0.01 and about 50 percent is of particular interest.

The crystalline solid solutions of the present invention can be produced, generally speaking, by converting a mixture of the components into the crystalline solid solutions by heating at an elevated temperature. Instead of using particles of solid silicon dioxides having various particle sizes, various chemical activities, various water contents and degrees of crystallisation, there can be used solutions or aqueous suspensions of silicon tetrahalides together with volatile or non-volatile alkalis or organic silicon compounds which are converted by hydrolysis or, generally, by solvolysis, into non-volatile silicon dioxide compounds. Furthermore, instead of using separately prepared aluminum and/or boron phosphates as host lattices precipitates of the compounds in water or other fluid media, or a mixture of solutions of equimolecular proportions of aluminum and/or boron and of phosphorus whose other components are volatile, or any mixture which provides aluminum phosphate ($AlPO_4$) or boron phosphate ($BPO_4$) by calcination may be used. Instead of the oxides of metals, such as those of beryllium, magnesium, zinc, boron, aluminum and the like, there can be used, for example, their hydroxides, carbonates, acetates, nitrates and formates. Furthermore, aqueous or other solutions of all the components can be precipitated by alkalis, such as ammonia, and/or solutions of appropriate salts containing all the requisite metals can be evaporated or the requisite components can be used wholly or partially in the form of sols or gels.

If desired, small amounts of a crystallization-promoting flux, such as potassium fluoride, can be added to the mixtures in order to facilitate the formation of the crystalline solid solutions.

When using compounds of a polyvalent metal in one of its lower valence states as a starting component which is to have this valence in the end product, i.e., in the crystalline solid solution, then it may be necessary to carry out the heating of the mixture in an inert gaseous atmosphere to exclude oxygen and prevent oxidation of the metal to a higher valence state.

The following examples are given for the purpose of illustrating the present invention:

*Example 1*

5.000 grams of finely divided silicon dioxide and 1.425 grams of phosphorus pentoxide (prepared from ammonium phosphate) and 0.100 gram of lithium oxide (obtained from lithium carbonate) are mixed; the mixture is calcined for half an hour at 800° C. The resulting product is then pulverized and heated again for half an hour at 1,000° C., and after pulverizing again for half an hour at 1,150° C. A white pigment with a tridymite structure in the form of a solid solution of lithium oxide and phosphorus pentoxide in silicon dioxide is obtained.

*Example 2*

5.000 grams of activated silicon dioxide, 2.270 grams of phosphorus pentoxide (prepared from ammonium phosphate) and 0.400 gram of beryllium oxide (prepared from beryllium carbonate) are mixed; the mixture is calcined for half an hour at 800° C. The resulting product is then pulverized and heated again for half an hour at 1,000° C., and after pulverizing again for half an hour at 1,150° C. A grey-white pigment with a tridymite structure in the form of a solid solution of beryllium oxide and phosphorus pentoxide in silicon dioxide is obtained.

*Example 3*

5.000 grams of finely divided silicon dioxide, 1.745 grams of phosphorus pentoxide (prepared from ammonium phosphate) and 1.000 gram of zinc oxide (prepared from zinc carbonate) together with a small amount of lithium fluoride as mineralizing agent are mixed together; the mixture is calcined for half an hour at 800° C., after pulverizing calcined for half an hour at 1,000° C., and after pulverizing again calcined for half an hour at 1,150° C. A white pigment with a tridymite structure in the form of a solid solution of zinc oxide and phosphorus pentoxide in silicon dioxide is obtained.

*Example 4*

5.000 grams of finely divided silicon dioxide, 1.976 grams phosphorus pentoxide (prepared from ammonium phosphate) and 1.000 gram of iron oxide (FeO) (prepared from $FeCO_3$) together with a small amount of lithium fluoride as mineralizing agent are mixed together; the mixture is calcined for half an hour at 800° C., after pulverizing calcined for half an hour at 1,000° C., and after pulverizing again calcined for half an hour at 1,150° C. A white-grey pigment having a tridymite structure in the form of a solid solution of iron oxide and phosphorus pentoxide in silicon dioxide is obtained.

*Example 5*

5.000 grams of activated silicon dioxide, 1.873 grams of phosphorus pentoxide (prepared from ammonium phosphate) and 1.000 gram of cupric oxide (prepared from cupric carbonate) together with a small amount of lithium fluoride as mineralizing agent are mixed together; the mixture calcined for half an hour at 800° C., after pulverizing calcined for half an hour at 1,000° C., and after pulverizing again calcined for half an hour at 1,150° C. A bright bluish-green pigment of tridymite structure in the form of a solid solution of cupric oxide and phosphorus pentoxide in silicon dioxide is obtained.

*Example 6*

5.000 grams of activated silicon dioxide, 0.757 gram of phosphorus pentoxide (prepared from ammonium phosphate) and 1.000 gram of gallium trioxide are mixed together; the mixture is calcined for half an hour at 800° C., after pulverizing calcined for half an hour at 1,000° C., and after pulverizing again calcined for half an hour at 1,150° C. A white pigment of tridymite structure in the form of a solid soluiton of gallium oxide and phosphorus pentoxide in silicon dioxide is obtained.

*Example 7*

5.000 grams of activated silicon dioxide, 0.880 gram of vanadium pentoxide and 0.100 gram of sodium oxide (prepared from sodium carbonate) are mixed; the mixture is calcined for half an hour at 800° C., after pulverizing calcined for half an hour at 1,000° C., and after pulverizing again calcined for half an hour at 1,150° C. A dark red-brown pigment of tridymite structure in the form of a solid solution of sodium oxide and vanadium pentoxide in silicon dioxide is obtained.

*Example 8*

5.000 grams of activated silicon dioxide, 2.255 grams of vanadium pentoxide, 0.500 gram of magnesium oxide (prepared from magnesium carbonate) and a small amount of lithium fluoride as mineralizing agents are mixed together; the mixture is calcined for half an hour at 800° C., after pulverizing calcined for half an hour at 1,000° C., after pulverizing again calcined for half an hour at 1,150° C. A yellowish browny-green pigment is obtained which, according to X-ray crystallographic analysis, has the tridymite structure in the form of a solid solution of magnesium oxide and vanadium pentoxide in silicon dioxide.

*Example 9*

5.000 grams of activated silicon dioxide, 0.642 gram of vanadium pentoxide and 0.200 gram of manganese oxide (prepared from manganese carbonate) are mixed; the mixture is calcined for half an hour at 800° C., after pulverizing calcined for half an hour at 1,000° C., and after pulverizing again calcined for half an hour at 1,150°

C. A greenish-brown pigment with the tridymite structure in the form of a solid solution of manganese oxide and vanadium pentoxide in silicon dioxide is obtained.

*Example 10*

5.000 grams of activated silicon dioxide, 0.522 gram of vanadium pentoxide and 0.200 gram of boron trioxide are mixed; the mixture is calcined for half an hour at 800° C., and after pulverizing calcined again for a further half an hour at 1,000° C. After slow cooling a beige pigment of tridymite structure in the form of a solid solution of boron oxide and vanadium pentoxide in silicon dioxide is obtained.

*Example 11*

5.000 grams of activated silicon dioxide, 1.444 grams of arsenic pentoxide and 0.500 gram of cupric oxide (prepared from cupric carbonate) are mixed; the mixture is calcined for half an hour at 800° C., after pulverizing calcined for half an hour at 900° C., and after further pulverizing calcined for half an hour at 1,000° C. A whitish blue-green pigment is obtained which, according to X-ray crystallographic analysis, possesses the tridymite lattice in the form of a solid solution of cupric oxide and arsenic pentoxide in silicon dioxide.

*Example 12*

5.000 grams of very finely divided silicon dioxide, 1.225 grams of arsenic pentoxide and 1.000 gram of gallium trioxide are mixed; the mixture is calcined for half an hour at 700° C. The resulting product is then pulverized and calcined for half an hour at 800° C. and after pulverizing again calcined for half an hour at 900° C. A white pigment of quartz structure in the form of a solid solution of gallium trioxide and arsenic pentoxide in silicon dioxide is obtained.

*Example 13*

5.000 grams of activated silicon dioxide, 2.220 grams of arsenic pentoxide and 0.200 gram of sodium oxide (prepared from sodium carbonate) are mixed; the mixture is calcined for half an hour at 800° C. The resulting product is then pulverized and calcined for half an hour at 900° C. and after pulverizing again calcined for half an hour at 1,000° C. A white pigment of tridymite structure in the form of a solid solution of sodium oxide and arsenic pentoxide in silicon dioxide is obtained.

*Example 14*

5.000 grams of silicon dioxide, 1.690 grams of phosphorus pentoxide (prepared from ammonium phosphate) and 0.500 gram of sodium fluoride are mixed; the mixture is calcined for half an hour at 800° C. The resulting product is then pulverized and calcined for half an hour at 1,000° C. and after pulverizing again calcined for half an hour at 1,150° C. A white pigment of tridymite structure in the form of a solid solution of sodium fluoride and phosphorus pentoxide in silicon dioxide is obtained.

*Example 15*

5.000 grams of activated silicon dioxide, 1.412 grams of arsenic pentoxide, 0.0451 gram of vanadium pentoxide, 0.143 gram of phosphorus pentoxide (prepared from ammonium phosphate), 0.500 gram of zinc oxide, 0.10 gram of magnesium oxide and 0.010 gram of lithium oxide are mixed. The mixture is calcined for half an hour at 800° C., after pulverizing is calcined for half an hour at 900° C. and after pulverizing again calcined for half an hour at 1,000° C. A dirty white pigment of tridymite structure in the form of a solid solution of arsenic pentoxide, vanadium pentoxide, phosphorus pentoxide, zinc oxide, magnesium oxide and lithium oxide in silicon dioxide is obtained.

*Example 16*

5.000 grams of aluminum phosphate, 0.200 gram of cuprous oxide and 0.596 gram of phosphorus pentoxide are well mixed together, calcined for half an hour at 800° C., after pulverizing calcined for half an hour at 900° C. and after further pulverizing calcined for half an hour at 1,000° C., the calcination being carried out in an atmosphere of nitrogen. A brownish-grey pigment of tridymite structure in the form of a solid solution of cuprous oxide and phosphorus pentoxide in aluminum phosphate is obtained.

*Example 17*

5.000 grams of aluminum phosphate, 0.200 gram of beryllium oxide and 1.136 grams of phosphorus pentoxide are well mixed together, calcined for half an hour at 800° C., after pulverization calcined for half an hour at 1,000° C. and after further pulverization calcined for half an hour at 1,150° C. A white pigment of high temperature tridymite structure in the form of a solid solution of beryllium oxide and phosphorus pentoxide in aluminum phosphate is obtained.

*Example 18*

5.000 grams of aluminum phosphate, 0.5000 gram of cobalt oxide (CoO) (prepared from $CoCO_3$) and 0.947 gram of phosphorus pentoxide (prepared from ammonium phosphate) are well mixed together, calcined for half an hour at 1,000° C. and after further pulverization calcined for half an hour at 1,100° C. A bluish-violet pigment of high temperature tridymite structure in the form of a solid solution of cobalt oxide and phosphorus pentoxide in aluminum phosphate is obtained.

*Example 19*

5.000 grams of aluminum phosphate, 1.000 gram of boron trioxide and 2.038 grams of phosphorus pentoxide (prepared from ammonium phosphate) are mixed, calcined for half an hour at 1,000° C. and after further pulverization calcined for half an hour at 1,150° C. A white pigment of beta cristobalite structure in the form of a solid solution of boron trioxide and phosphorus pentoxide in aluminum phosphate is obtained.

*Example 20*

14.094 grams of aluminum nitrate (containing 14.83 percent aluminum oxide), 4.968 grams of ferric nitrate (containing 20.13 percent ferric oxide) and 10.701 grams of ammonium phosphate are each dissolved in 100 milliliters of water, mixed with stirring and evaporated. The residue is calcined after pulverization for half-hour periods at 700° C., 800° C. and 900° C. A whitish-beige pigment of high temperature tridymite structure in the form of a solid solution of ferric oxide in aluminum phosphate is obtained.

*Example 21*

5.000 grams of aluminum phosphate, 0.200 gram of lithium fluoride and 1.084 grams of phosphorous pentoxide (prepared from ammonium phosphate) are well mixed, calcined for half an hour at 700° C. and after pulverization calcined for half an hour at 1,000° C. A white pigment with a somewhat faulty tridmite structure in the form of a solid solution of lithium fluoride and phosphorus pentoxide in aluminum phosphate is obtained.

*Example 22*

5.000 grams of aluminum phosphate (prepared from crystalline aluminum phosphate) 0.500 gram of zinc oxide (prepared from zinc carbonate) and 1.413 grams of arsenic acid are well mixed, calcined for half an hour at 800° C. and after puverization calcined for half an hour at 900° C. and for half an hour at 1,000° C. A coarse-grained white pigment of tridymite structure in the form of a solid solution of zinc oxide and arsenic pentoxide in aluminum phosphate is obtained.

Example 23

5.000 grams of aluminum phosphate, 0.500 gram of cupric oxide and 1.448 grams of arsenic pentoxide (prepared from solutions of aluminum nitrate, ammonium phosphate, cupric nitrate and arsenic acid) are well mixed, calcined for half an hour at 600° C. and after pulverization calcined for half-hour periods at each of the temperatures 700° C., 800° C. and 1,000° C. A bright turquoise-green pigment of tridymite structure in the form of a solid solution of cupric oxide and arsenic pentoxide in aluminum phosphate is obtained.

Example 24

5.000 grams of aluminum phosphate (prepared from aluminum hydroxide and ammonium phosphate), 6.420 grams of aluminum trioxide (prepared from aluminum hydroxide) and 14.500 grams of arsenic pentoxide (prepared from arsenic acid) are well mixed, calcined for half an hour at 600° C. and after pulverization calcined for half an hour at 800° C. A white pigment of quartz structure in the form of a solid solution of aluminum trioxide and arsenic pentoxide in aluminum phosphate is obtained.

Example 25

5.000 grams of aluminum phosphate, 1.000 gram of gallium trioxide and 1.226 grams of arsenic pentoxide are well mixed, calcined for half an hour at 800° C. and after pulverizing calcined for half an hour at 900° C. A white pigment of tridymite structure in the form of a solid solution of gallium trioxide and arsenic pentoxide in aluminum phosphate is obtained.

Example 26

5.000 grams of aluminum phosphate (prepared by precipitation from solutions of aluminum nitrate and ammonium phosphate), 0.500 gram of ferric oxide (prepared from ferric nitrate solution) and 0.720 gram of arsenic pentoxide (prepared from arsenic acid solution) are well mixed, calcined for half an hour at 600° C. and after pulverizing calcined for half-hour periods at each of the temperatures 700° C., 800° C. and 1,000° C. A greenish-rose-violet pigment of tridymite structure in the form of a solid solution of ferric oxide and arsenic pentoxide in aluminum phosphate is obtained.

Example 27

5.000 grams of aluminum phosphate, 0.100 gram of lithium oxide (prepared from lithium carbonate) and 1.827 grams of vanadium pentoxide are well mixed, calcined for half an hour at 800° C. and after pulverizing calcined for half an hour at 1,000° C. A golden yellow pigment of tridymite structure in the form of a solid solution of lithium oxide and vanadium pentoxide in aluminum phosphate is obtained.

Example 28

14.094 grams of aluminum nitrate (containing 14.83 percent aluminum oxide) and 8.197 grams of ammonium phosphate (containing 35.5 percent phosphorus pentoxide) are each dissolved in 100 milliliters of water. The aluminum nitrate solution is mixed with a solution of 0.703 gram of ferric carbonate (containing 71.07 percent iron oxide (FeO)) in hydrochloric acid and a solution of 1.675 grams of ammonium vanadate ($NH_4VO_3$) (containing 75.5 percent vanadium pentoxide) in nitric acid and ammonia and precipitated with the ammonium phosphate solution while stirring. The amount introduced corresponds to 5 grams of aluminum phosphate, 0.5 gram of iron oxide (FeO) and 1.266 grams of vanadium pentoxide. The mixture containing the precipitate is evaporated and, after drying at 100° C. calcined for 64 hours at 780° C. A yellowish dark brown pigment of high temperature tridymite lattice in the form of a solid solution of ferric oxide and vanadium pentoxide in aluminum phosphate is obtained.

Example 29

5.000 grams of aluminum phosphate, 0.500 gram of manganese oxide ($Mn_2O_3$) and °.576 gram of vanadium pentoxide are well mixed, calcined for half an hour at 800° C. and after pulverizing calcined for half an hour at 1,000° C. A brown pigment of tridymite structure in the form of a solid solution of manganese oxide and vanadium pentoxide in aluminum phosphate is obtained.

Example 30

Solutions of 14.094 grams of aluminum nitrate (containing 14.83 percent aluminum oxide) and 4.968 grams of ferric nitrate (containing 20.13 percent ferric oxide) in 100 milliliters water and 8.434 grams ammonium phosphate (containing 34.5 percent phosphorus pentoxide) in 100 milliliters of water and 1.509 grams of ammonium metavanadate (containing 75.5 percent vanadium pentoxide) in 25 milliliters of ammonia are mixed with the addition of 2 milliliters of concentrated nitric acid, stirred for five minutes and evaporated to dryness. After pulverization the residue is calcined for half-hour periods at each of the temperatures 400° C., 500° C., 600° C. and 780° C. and finally calcined for 63 hours at 780° C. in air. A yellow-orange pigment of tridymite structure in the form of a solid solution of ferric oxide and vanadium pentoxide in aluminum phosphate is obtained.

Example 31

5.000 grams of aluminum phosphate, 0.500 gram of iron oxide (FeO) (prepared from ferrous carbonate), 0.500 gram of ferric oxide and 1.432 grams of phosphorus pentoxide (prepared from ammonium phosphate) are well mixed, calcined for half an hour at 1,000° C. and after pulverizing calcined for half an hour at 1,100° C. A yellowish-grey-white pigment of tridymite structure in the form of a solid solution of ferric oxide and phosphorus pentoxide in aluminum phosphate is obtained.

Example 32

5.000 grams of aluminum phosphate, 0.500 gram of cobalt oxide (CoO) (prepared from cobalt carbonate ($CoCO_3$)), 0.947 gram of phosphorus pentoxide, 1.000 gram of boron trioxide and 2.038 grams of phosphorus pentoxide are well mixed, calcined for half an hour at 800° C. and after pulverizing calcined for half an hour at 1,000° C. A violet pigment of beta cristobalite structure in the form of a solid solution of cobalt oxide, boron trioxide and phosphorus pentoxide in aluminum phosphate is obtained.

Example 33

5.000 grams of aluminum phosphate are mixed with 5.000 grams of silicon dioxide and after pulverising calcined for half-hour periods at temperatures of 800° C., 1,000° C., 1,150° C. and 1,350° C. A white pigment of tridymite structure in the form of a solid solution of silicon dioxide in aluminum phosphate is obtained.

Example 34

5.000 grams of aluminum phosphate and 2.500 grams of beryllium fluoride are well mixed, calcined for half an hour at 800° C. and after pulverizing calcined for half an hour at 1,000° C. A white pigment of tridymite structure in the form of a solid solution of beryllium fluoride in aluminum phosphate is obtained.

Example 35

5.000 grams of aluminum phosphate and 1.000 gram of germanium dioxide are well mixed and after pulverization calcined for half-hour periods at temperatures of 800° C., 1,000° C. and 1,150° C. A white pigment of faulty high temperature tridymite structure in the form of a solid solution of germanium dioxide in aluminum phosphate is obtained.

Example 36

1.646 grams of boron trioxide (prepared from boron acid), 3.354 grams of phosphorus pentoxide (prepared from ammonium phosphate), 0.300 gram of sodium oxide (prepared from sodium carbonate) and 2.060 grams of phosphorus pentoxide (prepared from ammonium phosphate) are mixed, heated for fifteen minutes at 400–500° C. and after pulverizing calcined for half-hour periods at temperatures of 600° C., 800° C. and 1,000° C. A white pigment of low temperature cristobalite structure in the form of a solid solution of sodium oxide and phosphorus pentoxide in boron phosphate is obtained.

Example 37

1.646 grams of boron trioxide (prepared from boric acid), 3.354 grams of phosphorus pentoxide (prepared from ammonium phosphate), 0.500 gram of magnesium oxide (prepared from magnesium carbonate) and 1.760 grams of phosphorus pentoxide (prepared from ammonium phosphate) are mixed, heated for fifteen minutes at about 500° C. and after pulverizing calcined for half-hour periods at temperatures of 800° C., 1,000° C. and 1,150° C. A white pigment of low temperature cristobalite structure in the form of a solid solution of magnesium oxide and phosphorus pentoxide in boron phosphate is obtained.

Example 38

1.646 grams of boron trioxide (prepared from boric acid), 3.354 grams of phosphorus pentoxide (prepared from ammonium phosphate), 0.500 gram of manganese trioxide ($Mn_2O_3$) (prepared from $MnCO_3$) and 0.450 gram of phosphorus pentoxide (prepared from ammonium phosphate) are mixed, heated for fifteen minutes to 400–500° C. and after pulverizing heated for half-hour periods at temperatures of 800° C., 1,000° C. and 1,150° C. A white pigment of low temperature cristobalite structure in the form of a solid solution of manganese trioxide and phosphorus pentoxide in boron phosphate is obtained.

Example 39

1.646 grams of boron trioxide (prepared from boric acid), 3.354 grams of phosphorus pentoxide (prepared from ammonium phosphate), 0.100 gram of lithium oxide (prepared from lithium carbonate) and 1.826 grams of vanadium pentoxide (prepared from ammonium vanadate), heated for fifteen minutes at 400–500° C. and after pulverizing calcined for half-hour periods at temperatures 700° C. and 750° C. A bright orange-brown pigment of low temperature cristobalite structure in the form of a solid solution on lithium oxide and vanadium pentoxide in boron phosphate is obtained.

Example 40

1.646 grams of boron trioxide (prepared from boric acid), 3.354 grams of phosphorus pentoxide (prepared from ammonium phosphate), 0.500 gram of cobalt oxide (CoO) (prepared from $CoCO_3$) and 1.215 grams of vanadium pentoxide (prepared from ammonium vanadate) are mixed, heated for fifteen minutes at about 500° C. and after pulverizing calcined for half-hour periods at temperatures of 700° C. and 900° C. A brown-olive coloured pigment of low temperature cristobalite structure in the form of a solid solution of cobalt oxide and vanadium pentoxide in boron phosphate is obtained.

Example 41

1.646 grams of boron trioxide (prepared from boric acid), 3.354 grams of phosphorus pentoxide (prepared from ammonium phosphate), 0.500 gram of boron trioxide (prepared from boric acid) and 1.308 grams of vanadium pentoxide (prepared from ammonium vanadate) are mixed, heated for fifteen minutes for half-hour periods at temperatures of 600° C., 800° C. and 1,000° C. A bright brown-orange coloured pigment of low temperature cristobalite structure in the form of a solid solution of boron trioxide and vanadium pentoxide in boron phosphate is obtained.

Example 42

1.646 grams of boron trioxide (prepared from boric acid), 3.354 grams of phosphorus pentoxide (prepared from ammonium phosphate), 0.300 gram of beryllium oxide (prepared from beryllium hydroxide) and 2.760 grams of arsenic pentoxide (prepared from arsenic acid) are mixed, heated for fifteen minutes to 400–500° C. and after pulverizing calcined for half-hour periods at temperatures of 700° C., 900° C. and 1,000° C. A white pigment of low temperature cristobalite structure in the form of a solid solution of beryllium oxide and arsenic pentoxide in boron phosphate is obtained.

Example 43

5.000 grams of boron phosphate ($BPO_4$), 0.300 gram of lithium fluoride and 2.664 grams of arsenic pentoxide (prepared from arsenic acid) are mixed, heated for half-hour periods to 600° C. and after pulverising calcined for half-hour periods at temperatures of 800° C. and 1,000° C. A white pigment of low temperature cristobalite structure in the form of a solid solution of lithium fluoride and arsenic pentoxide in boron phosphate is obtained.

Example 44

5.000 grams of boron phosphate ($BPO_4$) and 1.000 gram of germanium dioxide are carefully mixed, calcined for half an hour at 600° C. and after pulverizing calcined for half-hour periods at temperatures of 800° C. and 1,000° C. A white pigment of low temperature cristobalite structure in the form of a solid solution of germanium dioxide in boron phosphate is obtained.

Example 45

1.646 grams of boron trioxide (prepared from boric acid), 3.354 grams of phosphorus pentoxide (prepared from ammonium phosphate), 0.060 gram of lithium oxide (prepared from lithium carbonate), 0.100 gram of zinc oxide (prepared from zinc carbonate), 0.100 gram of cupric oxide (prepared from cupric carbonate), 0.100 gram of aluminum oxide (prepared from aluminum hydroxide), 0.100 gram of ferric oxide and 1.435 grams of phosphorus pentoxide (prepared from ammonium phosphate) are thoroughly mixed, heated for fifteen minutes to 400–500° C. and after pulverizing calcined for half-hour periods at temperatures of 600° C., 800° C. and 1,000° C. A pale bright-green pigment of low temperature crystobalite structure in the form of a solid solution of lithium oxide, zinc oxide, cupric oxide, aluminum oxide, ferric oxide and phosphorus pentoxide in boron phosphate is obtained.

We claim:

1. A crystalline solid solution having a silica structure which consists of a compound selected from the group consisting of silicon dioxide, aluminum phosphate, and boron phosphate as a host component and which contains as a guest component at least one oxide of an element selected from the group consisting of pentavalent phosphorus, arsenic and vanadium, as well as compounds selected from the group consisting of oxides and fluorides of metals having a valence of at most four, which have an ionic radius between 0.23 A. and 0.98 A. with a statistical average ionic radius of the incorporated cations of 0.26 A. to 0.59 A., the ratio of the sum of the added cations to the sum of the added anions being about 1:2, while preserving a statistical electronic neutrality in the lattice.

2. A process for the production of a crystalline solid solution having a silica structure which consists of a compound selected from the group consisting of silicon dioxide, aluminum phosphate, and boron phosphate as a host component and which contains as a guest component at least one oxide of an element selected from the group consisting of pentavalent phosphorus, arsenic and vanadium, as well as compounds selected from the group consisting of oxides and fluorides of metals having a valence of at most four, which have an ionic radius between 0.23 A. and 0.98 A. with a statistical average ionic radius of the incorporated cations of 0.26 A. to 0.59 A., the ratio of the sum of the added cations to the sum of the added anions being about 1:2, while preserving a statistical electronic neutrality in the lattice which comprises mixing starting substances which when heated produce the host and guest components of the crystalline solid solution and thereafter heating the mixture at a temperature above 400° C. and for such a period that it is converted into a crystalline solid solution.

3. A process as defined in claim 2 in which the compounds of the starting substances are preliminarily prepared in the form of solutions which are mixed, evaporated to dryness, and subjected to heating.

4. A process as defined in claim 2 in which the compounds of the starting substances are preliminarily prepared in the form of suspensions which are mixed, evaporated to dryness, and subjected to heating.

5. A process as defined in claim 2 in which the starting substances are obtained by precipitation from a solution and the precipitated solids are subjected to heating.

6. A process as defined in claim 2 in which a crystallization promoting flux is added to the mixture before it is subjected to heating in order to facilitate the formation of a crystalline solid solution.

7. A process as defined in claim 2 in which the heating of the mixture is performed in an inert gaseous atmosphere.

8. A crystalline solid solution of sodium oxide and vanadium pentoxide in silicon dioxide, the amount of sodium oxide and vanadium pentoxide being such that the ratio of the cations to the anions thereof corresponds to about 1:2 while preserving a statistical electronic neutrality in the lattice.

9. A crystalline solid solution of manganese oxide and vanadium pentoxide in aluminum phosphate, the amount of manganese oxide and vanadium pentoxide being such that the ratio of the cations to the anions thereof corresponds to about 1:2 while preserving a statistical electronic neutrality in the lattice.

10. A crystalline solid solution of silicon dioxide and vanadium pentoxide in boron phosphate, the amount of silicon dioxide and vanadium pentoxide being such that the ratio of the cations of the anions thereof corresponds to about 1:2 while preserving a statistical electronic neutrality in the lattice.

11. A crystalline solid solution of cobalt oxide and vanadium pentoxide in boron phosphate, the amount of cobalt oxide and vanadium pentoxide being of such that the ratio of the cations of the anions thereof corresponds to about 1:2 while preserving a statistical electronic neutrality in the lattice.

12. A crystalline solid solution of boron oxide and vanadium pentoxide in boron phosphate, the amount of boron oxide and vanadium pentoxide being of such that the ratio of the cations to the anions thereof corresponds to about 1:2 while preserving a statistical electronic neutrality in the lattice.

References Cited in the file of this patent

UNITED STATES PATENTS

| 2,434,674 | Pincus | Jan. 20, 1948 |
| 2,875,085 | Morris et al. | Feb. 24, 1959 |

FOREIGN PATENTS

| 625,448 | Great Britain | June 28, 1949 |
| 814,761 | Great Britain | June 10, 1959 |

UNITED STATES PATENT OFFICE
CERTIFICATE OF CORRECTION

May 28, 1963

Patent No. 3,091,544

Franz Hund et al.

It is hereby certified that error appears in the above numbered patent requiring correction and that the said Letters Patent should read as corrected below.

Column 2, line 7, for "(V)" read -- (IV) --; column 8, line 8, for "0.576" read -- 0.576 --.

Signed and sealed this 21st day of January 1964.

(SEAL)
Attest:
ERNEST W. SWIDER

Attesting Officer

EDWIN L. REYNOLDS

Acting Commissioner of Patents